Jan. 28, 1964  D. P. COOPER, JR., ET AL  3,119,317
PHOTOGRAPHIC APPARATUS
Filed May 5, 1960  7 Sheets-Sheet 1

INVENTORS
Dexter P. Cooper, Jr.
Peter N. Mark
BY Brown and Mikulka
and
Robert J. Schiller
ATTORNEYS Jan. 28, 1964   D. P. COOPER, JR., ET AL   3,119,317
PHOTOGRAPHIC APPARATUS Filed May 5, 1960   7 Sheets-Sheet 2

Dexter P. Cooper, Jr.
Peter H. Mark
INVENTORS

BY Brown and Mikulka
and
Robert J. Schiller
ATTORNEYS

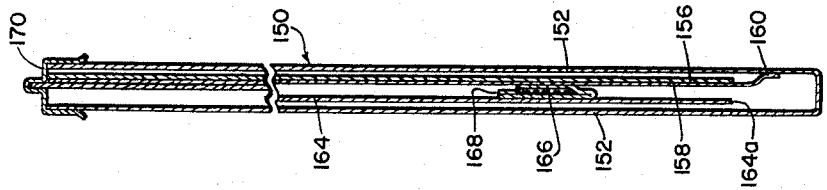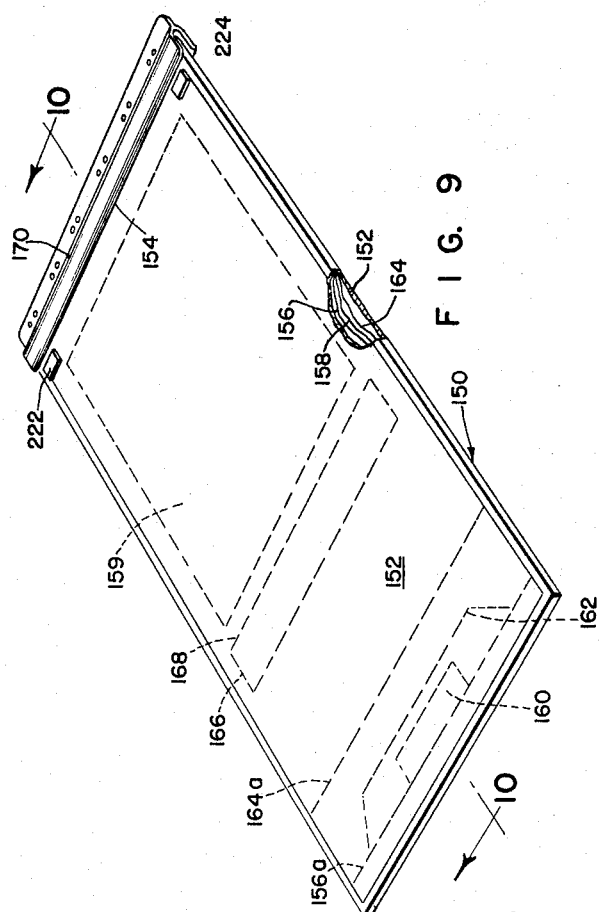

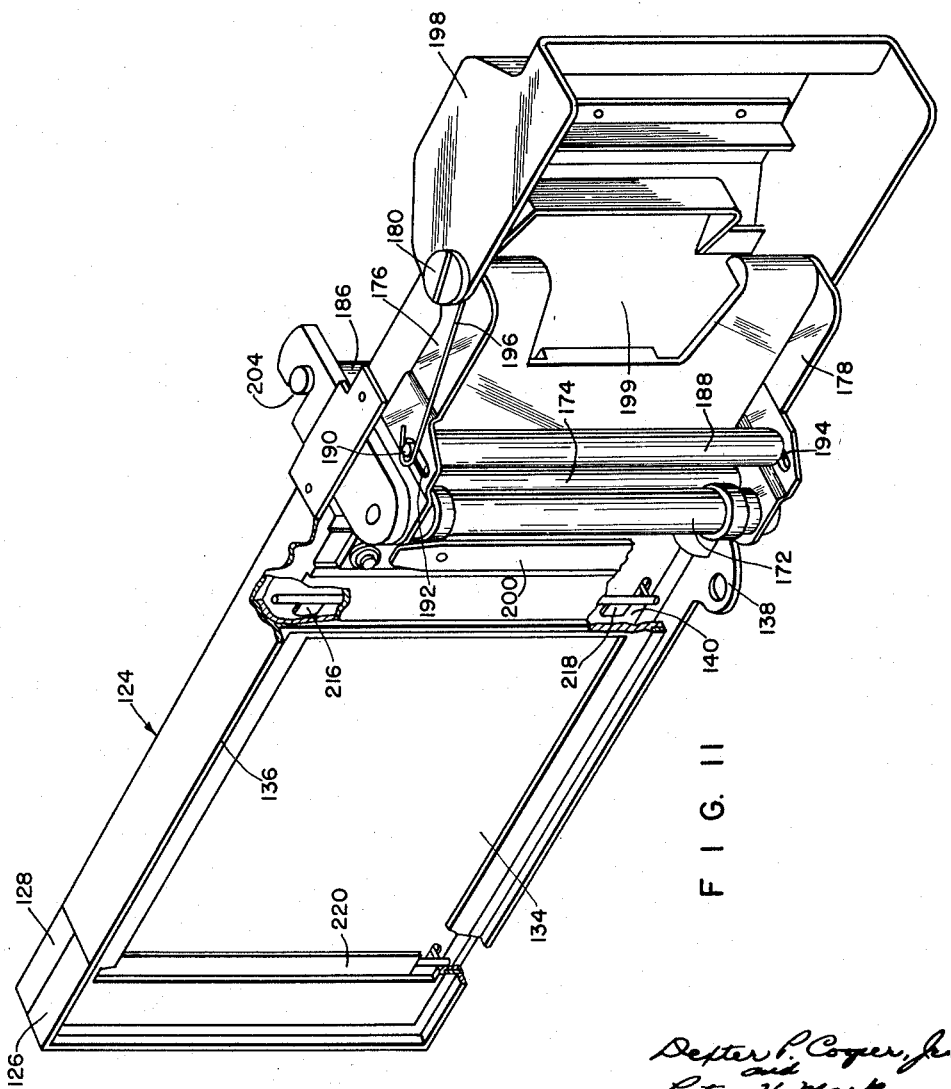

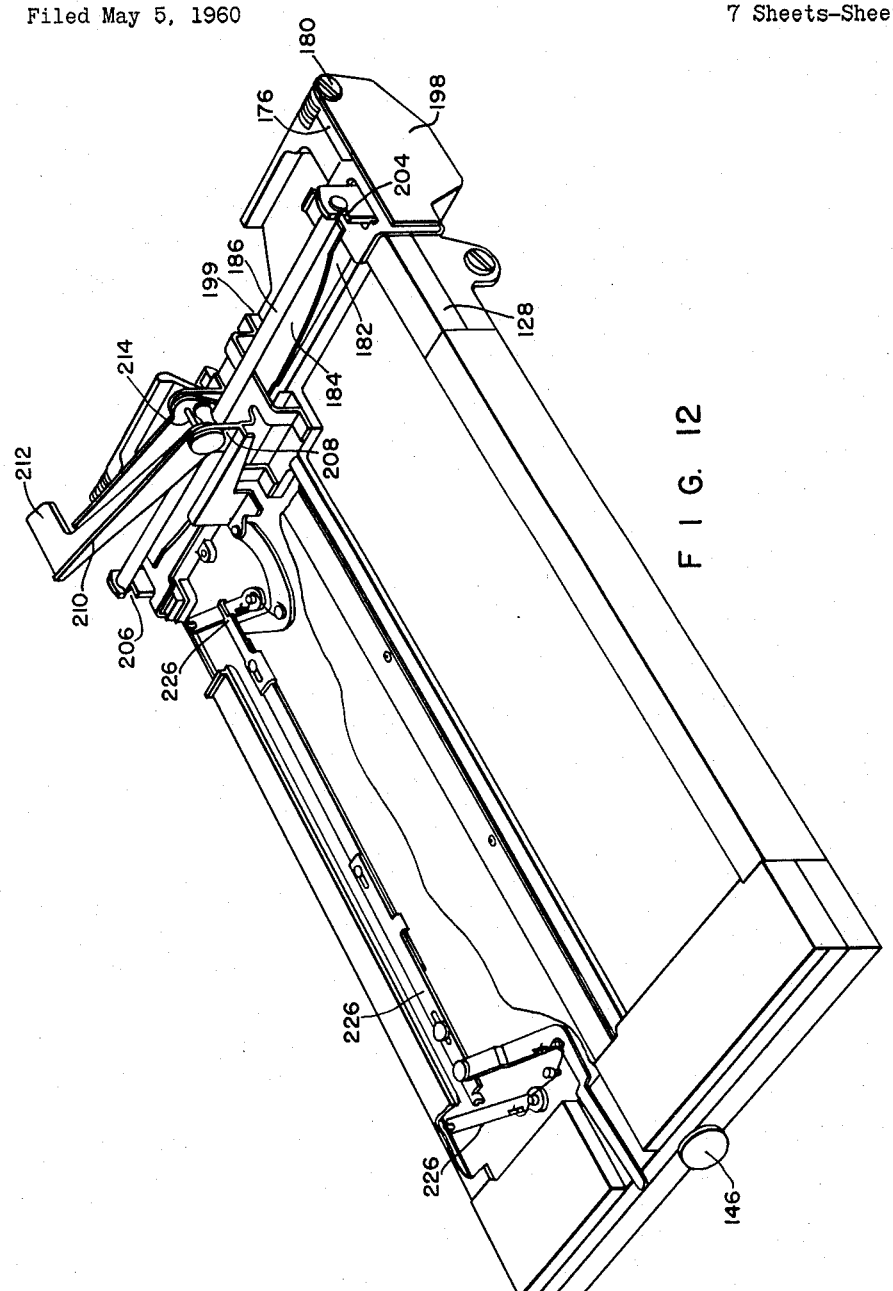

United States Patent Office 3,119,317
Patented Jan. 28, 1964

3,119,317
PHOTOGRAPHIC APPARATUS
Dexter P. Cooper, Jr., Lexington, and Peter H. Mark, Belmont, Mass., assignors to Polaroid Corporation, Cambridge, Mass., a corporation of Delaware
Filed May 5, 1960, Ser. No. 26,991
5 Claims. (Cl. 95—73)

This invention relates to photography and more particularly to novel photographic products and apparatus useful in photographic contact print reproduction.

The technique of producing positive photographic prints of excellent quality by use of a diffusion-transfer reversal process in a camera is now well known. The negative formed in the process generally cannot be used to produce additional prints by the usual contact printing methods. However, multiple copies are being produced generally by one of two methods, both of which employ cameras. In the first method the print is photographed onto conventional film and an intermediate negative produced. Additional copies are made from the intermediate negatives by known methods. Copies are also produced by photographing the print with a copying device which employs a diffusion-transfer reversal processing camera, thereby making a print of the print. In the first of these methods the quality of the copies depends largely upon the skill and equipment of the copyist. And, although the latter method requires little skill to form prints of high quality, the equipment is complex in construction and operation and somewhat bulky.

The present invention relates to apparatus concerned with photographic reproduction techniques which do not involve the use of a camera, are simple, require little, if any, manual dexterity and technical knowledge, and quickly produce copies of excellent quality.

One object, therefore, of the present invention is to provide a novel, highly compact, readily portable, integrated device for reproducing subject matter having sheet form.

Another object of the invention is to provide a device of the type described for producing a "dry," permanent, finished copy of the subject matter within a very short time interval.

Yet another object of this invention is the provision of such a device, including an electroluminescent element, means for electrically exciting said element, means for differentially exposing photosensitive sheet material to radiation from the excited luminor, and means for treating the exposed sheet material by a diffusion-transfer reversal process.

Other objects of the invention will in part be obvious and will in part appear hereinafter.

The invention accordingly comprises the apparatus possessing the construction, combination of elements and arrangements of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 9 is a perspective, schematic view, with parts broken away, of a composite assembly, including a photosensitive element, adapted for diffusion-transfer reversal processing;

FIG. 10 is a cross-sectional view of the assembly of FIG. 9;

FIG. 11 is a perspective view, partially broken away, of a portion of the apparatus of FIG. 1 for holding and processing a photosensitive element;

FIG. 12 is a perspective view, with parts cut away, of the portion of FIG. 11 from an opposite side thereof;

Figure 1:
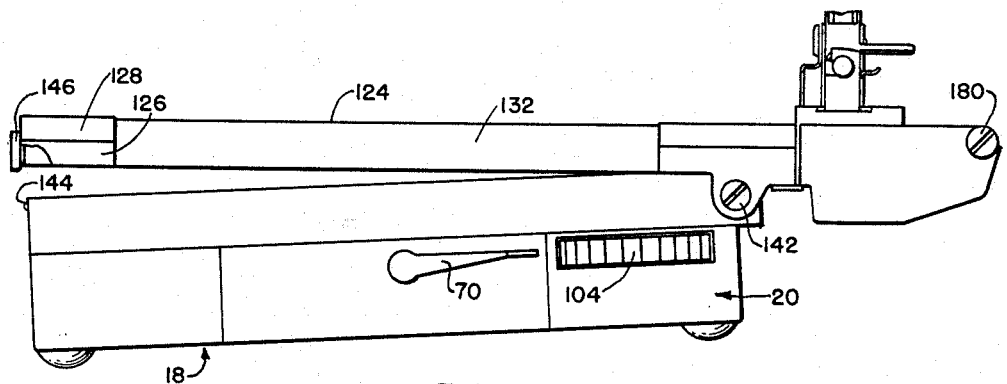
FIGURE 1 is a side elevation of one form of apparatus embodying the invention.

The invention concerns means for performing certain physical steps which make possible, within a short time interval and within a small physical volume of space, the transfer of information from a first element to a second element in permanent form. This is accomplished by providing an apparatus which includes, as a source of radiation, an electroluminescent element which is advantageously formed in a substantially flat shape, and means for holding photosensitive sheet material in which an image may be formed by differential exposure to the radiation. The first element, i.e., sheet material containing the information to be copied, is employed to mechanically modulate, either by transmission or reflection, the radiation emanating from the electroluminescent element and forming the latent image. Such an apparatus, known in the art, insures maximum radiation transfer efficiency, maximum exposure for the light level produced and minimum usage of space.

The electroluminescent materials employed in the various apparatus and products hereinafter described include only those materials which, when subjected to excitation in an electrical field, generate non-thermal radiation characteristics of the particular material. It will be understood, however, that the invention is not limited to the particular examples of electroluminescent polycrystallites set forth hereinafter.

It should be noted, however, that the information impressed upon the photosensitive sheet material is not available until the latter is processed. Prior art devices of the type described require removal of the photosensitive sheet from the apparatus with attendant loss of time and possible fogging due to the inadvertent exposure during transfer to processing equipment.

The invention is embodied in an apparatus which includes means for effectuating diffusion-transfer reversal processing by cooperation with a composite photographic structure having fixed and movable sheet-like and enclosure parts, one of which is a photosensitive sheet; the invention is therefore capable of producing finished positive print copies within a very short time after insertion of the photosensitive sheet material into the apparatus. The photosensitive sheet, after exposure, is processed by superposing it with another sheet and treating the two with a fluid processing composition, the treatment being accomplished by distributing the processing composition between the two sheets. The photosensitive sheet comprises a stratum of photosensitive material disposed upon a suitable base or support, the material being adapted to attain a developable latent image by differential exposure to actinic radiation. Typical photosensitive material comprises an emulsion of silver halide in a colloid stratum wherein the colloid may be a natural colloid such as gelatin, agar, albumin, or a cellulosic colloid such as carboxymethyl cellulose. The colloid may also be a synthetic such as a vinyl polymer, an example of which would be polyvinyl alcohol, or it may be a linear polyamide such as polyhexamethylene adipamide. Of course, instead of silver halide in the emulsion one may employ other heavy metal salts capable of forming chemically developable latent images upon exposure to actinic radiation, as well as ferric salts such as the ferricyanides, certain diazonium compounds and bichromates.

The other sheet may merely aid in the distribution of the processing fluid, but is preferably adapted to serve as a support for an image-receiving layer in which may be produced a visible print of an image recorded by the photosensitive material. The other sheet comprises a suitable support material, some examples being paper, particularly kraft or baryta, a polymer, e.g., cellulose acetate, cellulose nitrate, cellulose butyrate, or glass, metal or even ceramics.

The processing composition, in the preferred form, when spread in a uniformly thin layer between the two sheets, preferably effectuates a transfer of image-forming substances such as occurs in a silver halide diffusion-transfer reversal process, by which the latent image in the photosensitive sheet is developed and a positive print is produced in an image-receiving layer between the sheets. The receiving layer comprises a receptive stratum which provides a silver precipitating environment, e.g., when the emulsion includes a silver salt, a heavy metal salt, sulphide, selenide, thiooxalate or thioacetamide dispersed in a silica matrix. The constitution of the receiving layer, however, is quite dependent upon the nature of the photosensitive stratum with which the layer is intended to be superposed. Where the photosensitive material is a silver halide and the receiving layer is a silver-receptive stratum, the processing composition comprises an aqueous solution of a silver halide developer such as hydroquinone, a silver halide solvent such as sodium thiosulphate and an alkali such as sodium hydroxide.

Means are provided for maintaining the photosensitive and other sheet in superposed relation after treatment with the fluid processing composition. This relation continues for a predetermined processing period during which the exposed silver halide of the photosensitive sheet is reduced to silver and the unreduced silver halide of the photosensitive sheet forms a water-soluble, complex silver salt which diffuses through the layer of composition and, upon being reduced to silver, forms a visible print at an image-receiving layer. Examples of suitable photographic materials useful in apparatus of the type disclosed herein are described in detail in U.S. Patent No. 2,543,181, issued February 27, 1951, to Edwin H. Land, U.S. Patent No. 2,661,293, issued December 1, 1953, to Edwin H. Land, U.S. Patent No. 2,647,049, issued July 28, 1953, to Edwin H. Land, U.S. Patent No. 2,614,926, issued October 21, 1952, to Edwin H. Land, U.S. Patent No. 2,774,668, issued December 18, 1956, to Howard G. Rogers, and U.S. Patent No. 2,662,822, issued December 15, 1953, to Edwin H. Land.

It is to be understood that the apparatus and products herein described are not limited to use with any particular species of photosensitive or other sheet materials, the terms "photosensitive" and "other" being used in their broader sense to indicate a first sheet which is at least photosensitive and another sheet which may merely aid in spreading a processing composition over the surface of the photosensitive sheet and which may, if desired, possess other characteristics.

Reference is now made to the drawings, particularly to FIGS. 1 through 12, inclusive, wherein is shown one form of copier apparatus embodying the invention and indicated generally by the reference numeral 18. Copier 18 includes means such as bed 20 for supporting an electroluminescent element, such as plate 22. Bed 20 comprises a substantially rectangular element such as planar, thin, rigid plate or floor 26 supporting four walls 28, 30, 32 and 34 disposed around the periphery of floor 26, thereby defining a concentrically disposed dished-out space or well 38 which is, of course, also rectangular in form. The marginal walls are wide enough to allow them to be formed, for instance, as hollow members out of thin, rigid material such as sheet metal.

Figure 3:
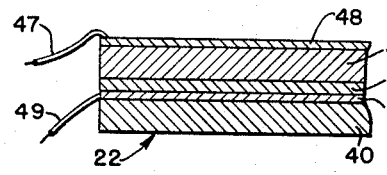
FIG. 3 is a schematic, cross-sectional view of an electroluminescent element of the embodiment of FIG. 2.

Plate 22 may comprise any of the several commercially available electroluminescent plates, but a preferred form thereof is shown in cross section in FIG. 3. It will be seen that plate 22 comprises a plurality of layers or strata in generally superposed relation, the relative thickness of the various strata being exaggerated for ease of representation. The bottom stratum, which is adapted to be disposed adjacent floor 26, is a substantially planar support stratum 40 which may be formed of metal, glass, or some other readily available, inexpensive, substantially rigid material. Where the support stratum is electrically non-conductive, an electrically conductive stratum or electrode 42 is preferably provided next adjacent stratum 40 as shown. Electrode 42 may be formed, for instance, of evaporated aluminum, tin oxide or the like. Next in order and overlying stratum 42 is layer 44 formed, in the preferred embodiment, from a substantially homogeneous composition including one or more electroluminescent phosphors or polycrystallites, such as copper-activated zinc sulphide with an iodine coactivator, and a dielectric binder substance, such as glass, ceramics, and epoxy plastics, for retaining the polycrystallites in the form of a thin, substantially uniform layer.

The polycrystallites embedded in the binder in layer 44 are of discrete size, and their orientation and density distribution throughout the binder varies somewhat. Upon excitation of the luminor, radiation therefrom tends to appear somewhat grainy. Consequently, in the preferred embodiment there is provided means, such as layer 46, for averaging out or diffusing radiation emanating from layer 44. In the preferred embodiment layer 46 is of several orders of thickness greater than layer 44 and is formed from a material, such as a thin dispersion of titanium dioxide or barium oxide in an appropriate matrix, which is translucent [high scattering with minimum absorption] to the radiation from the electroluminescent layer. The electroluminescent plate also includes top stratum 48 which is formed of a substantially transparent, electrically conductive stratum which serves as the second electrode of the plate. Typically, such a stratum may be formed by sputtering a thin layer of gold upon the surface of the translucent diffusing layer. The relative positions of the various strata may be somewhat altered without materially affecting the performance of plate 22. Electrical considerations, of course, dictate that the two electrically conductive strata be on opposite sides of the electroluminescent layer 44 in order to provide the field necessary for excitation. In a like manner, optical considerations dictate that at least one of the electrically conductive strata be substantially transparent to allow emission of light and that the translucent diffusing layer be disposed to the same side of layer 44 as the transparent electrode to diffuse transmission of the emitted light therethrough.

The electroluminescent plate is preferably formed as a rectangle which is dimensioned to fit within well 38 with, however, sufficient loose tolerance to allow free movability of the electroluminescent plate up and down within the well. Electrically conductive leads 47 and 49 are connected respectively to stratum 48 and stratum 42 for conducting exciting voltage to the latter.

Figure 4:
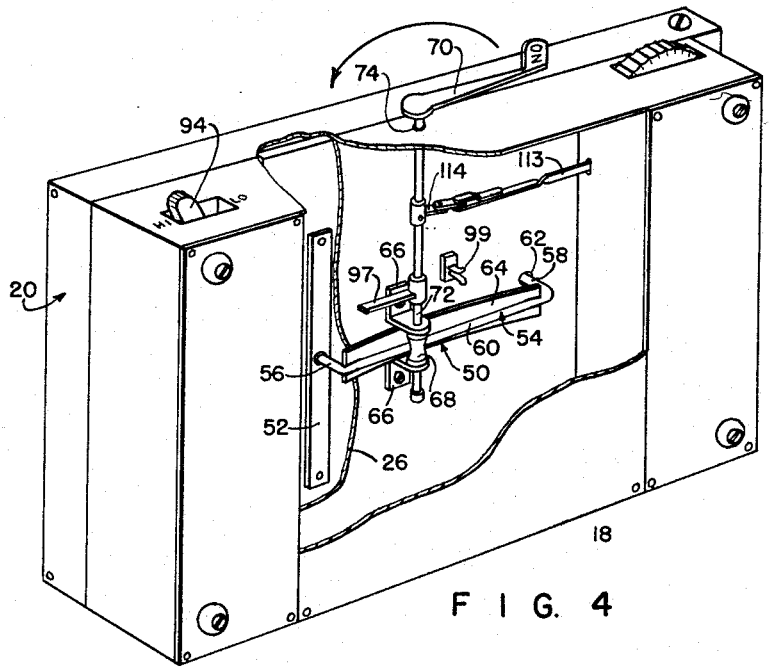
FIG. 4 is a partially cut away, perspective view of the bottom and two sides of a major portion of the apparatus of FIG. 2.

As a means for supporting and moving the electroluminescent plate there is provided a mechanism shown particularly in FIG. 4 and identified generally by the reference numeral 50. Mechanism 50, in the form shown, includes a pair of flat, elongated straps 52 (only one of which is shown) which are firmly mounted by suitable mounting means upon that side of plate 22 adapted to be adjacent floor 26, for instance on support layer 40. Straps 52 are preferably disposed parallel to one another at opposite ends of and transversely of plate 22. Means, such as U-shaped rod 54, provides a substantially rigid connection between the straps. Rod 54 includes a pair of short, approximately parallel arms 56 and 58, joined by a substantially linear, transverse portion 60 which extends approximately the distance between the two straps. Arms 56 and 58 extend through openings 62 (only one of which is shown) in floor 26 and are firmly joined respectively to straps 52 intermediate the ends and approximately perpendicularly thereof. As a means for biasing rod 54 away from floor 26, and therefore for biasing plate 22 toward floor 26, there is provided resilient means such as arcuate spring 64, the ends of which are engaged respectively with the intersections of arms 58 and 56 with transverse portion 60 of the rod, an intermediate portion of arcuate spring 64 bearing against floor 26.

Mechanism 50 also includes means for moving plate 22 against the bias of spring 64. This is effected by a pair of brackets 66 mounted upon floor 26 and extending outwardly therefrom respectively on opposite sides of spring 64. Eccentrically suspended for rotation between the bracket members is an axle supporting a roller-type bearing 68 in engagement with portion 60 of rod 54. For rotating the axle there is provided a toggle type lever mechanism comprising handle portion 70 and shaft 72, the latter being rigidly connected at one end to handle 70 and at its other end to the axle and roller bearing 68. One end of shaft 72 extends through an aperture in a bracket to connect with the axle, the other end extending through an opening 74 in wall 34 to connect with handle portion 70 of shaft 72 which lies outside of the external periphery of bed 20 and is readily available for manual manipulation. Whenever handle 70 is moved to rotate shaft 72, bearing 68 is moved eccentrically toward or away from bed floor 26 in accordance with the direction of rotation of the shaft and, consequently, rod 54 is moved either against or with the direction of the bias exerted by spring 64.

Figure 5:
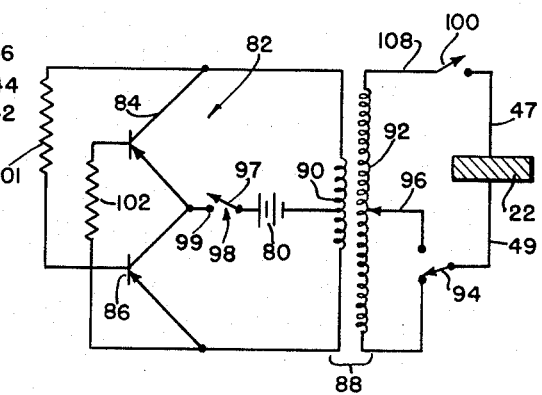
FIG. 5 is a schematic circuit diagram of an electrical energization means employed with the electroluminescent element of FIG. 3.

In order to provide the excitation field in which the phosphors will luminesce, means are included for powering the electrically conducting strata of plate 22, the electroluminescence being produced by time-variation of the intensity of the excitation field. For maximum convenience and portability, one embodiment of a power source is provided as a direct current source such as battery 80; therefore the copier requires means for changing the direct current to a time-variable voltage applicable to the electroluminescent plate. As illustrated in FIG. 5, one form of this means is an oscillator 82 which, for compactness and reliability, includes a pair of transistors 84 and 86 coupled to battery 80 and to each other in push-pull, the alternating output of the oscillator being inductively coupled through step-up transformer 88 to the electrically conductive strata of plate 22. Transformer 88 includes the usual primary and secondary windings 90 and 92 which, in the preferred form, have a respective turn ratio of 1 to 10,000. The primary winding is center tapped to the battery.

The device includes a manually engageable, two-position switch 94 which when in one position (as shown both in FIG. 4 and FIG. 5) connects plate 22 across the entire secondary winding. In the other position, switch 94 connects plate 22 to secondary 92 through lead 96 which center taps the secondary. The operation of switch 94, which is mounted on bed 20 for ready accessibility, provides for the selection of one of two different exciting voltages for varying the luminous intensity of plate 22 to match the sensitivity or speed of the photosensitive element employed with the latter. Second switch means 98 is provided in the circuit in series between the battery and the transistors as a positive on-and-off control for the oscillator. For simplicity in operation, as shown in FIG. 4, one terminal such as blade 97 of switch 98 is mounted for movement upon shaft 72, the other terminal or jack 99 being mounted on the underside of floor 26 in the path of movement of blade 97 for positive engagement with the latter. Transistors 84 and 86 are provided in their respective base circuits with resistors 101 and 102 in order to limit the current drawn by the base during the on-state of the transistors and, in a measure, to predetermine the frequency of the oscillator output. By providing oscillator 82 with variable resistors for resistors 101 or 102 or both, the frequency of the voltage impressed on plate 22 may be varied to change characteristics of the output radiation of the plate. The transistors, battery, resistors and transformer are all preferably mounted on bed 20 adjacent mechanism 50, for instance, within container 95.

A preferred embodiment employs two 2N467 transistors as transistors 84 and 86, the current limiting resistors 101 and 102 both being 500 ohm resistors, while battery 80 is a 1.5 volt pen-light type. Transformer 88 used in this embodiment was a model TA–33 manufactured by The Chicago Standard Transformer Corporation. With a commercially available Panelescent plate manufactured by Sylvania Electric Co. as plate 22 and these circuit values, oscillator 82 provides an output voltage at a frequency between 60 and 80 c.p.s.

Figure 7:
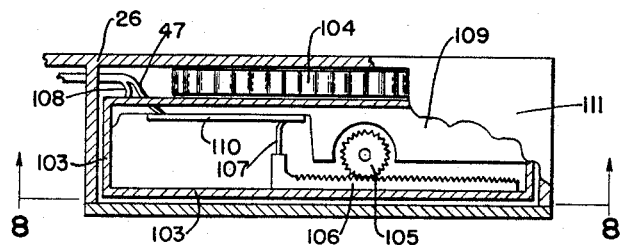
FIG. 7 is a view, partly in fragment, partly in cross-section of a timing switch forming part of the embodiment of FIG. 2.
Figure 8:
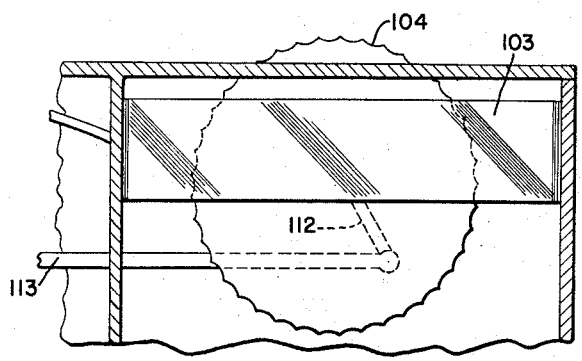
FIG. 8 is a cross-sectional view of the switch of FIG. 7.

In the embodiment of the oscillator shown, the time during which plate 22 is energized is controllable by manual manipulation of a switch means, such as switch 98, alone. However, in the preferred form of the invention, means, shown schematically in FIG. 5 as timing switch mechanism 100, are provided for automatically controlling the energization timing of plate 22 in accordance with a predetermined setting by the operator. One embodiment of switch mechanism 100, as shown in FIGS. 4, 7 and 8, comprises a substantially hollow casing or enclosure 103 mounted at one end of bed 20 adjacent the under side of floor 26. Enclosed within casing 103 is a driving mechanism such as a well-known, spring-loaded, clockwork mechanism or motor (not shown) which is energized or wound in accordance with the angular displacement of a winding device, such as wheel 104, from a predetermined rest position. Wheel 104 is so mounted upon casing 103 that a peripheral portion of wheel 104 extends beyond an edge of floor 26 for manual engagement. The clockwork mechanism when in operation drives pinion gear 105 at a substantially constant rate of rotation. An elongated movable element, such as toothed rack 106, is disposed in engagement with pinion gear 105 for translational movement along its axis of elongation when gear 105 is rotated. One extremity of the rack 106 has a sliding switch contact, such as whisker 107, formed of a resilient material. Rack 106 is movable from a limit stop provided by one end of casing 103 to another limit stop provided by the opposite end of the casing.

One lead 108 to switch 100 is connected to the casing, the casing being so mounted adjacent floor 26 as to be electrically insulated from the copier 18. While wheel 104 is preferably formed of an electrically nonconductive substance such as Bakelite, Vinyon or other suitable plastic, the clockwork mechanism including pinion 105 and its supporting shaft, rack 106 and whisker 107 are all formed of an electrically conducting substance such as brass or other metal and are sufficiently in contact with one or another to furnish a continuity of the circuit from lead 108 to whisker 107.

Firmly mounted within casing 103 is an electrically insulating support member such as block 109. Mounted on block 109 and, therefore, insulated from the casing, is an elongated flat electrode or contact 110 having an elongated dimension substantially parallel with the path of movement of rack 106 and being in engagement with whisker 107 from one limit stop of rack 106 to a point just short of the other limit of motion of the rack. Contact 110 is electrically connected with the other lead 47 to switch 100, lead 47 being, of course, appropriately insulated from contact with any of the other elements of the switch. Casing 103 and the other components of the switch are enclosed by a protective container or cover 111 mounted on floor 26.

Actuating means shown in FIGS. 4 and 8 include lever 112 for starting and stopping the operation of the clockwork mechanism which rotates pinion 105. Lever 112 is movable from a first position at which the clockwork mechanism is arrested, to a second position at which the clockwork mechanism is freed to run. For simplicity, means are provided for moving lever 112 in conjunction with the operation of the electrical elements of the copier. This is effected by the pivotal attachment to the movable extremity of lever 112 of connecting link 113 which in turn, as shown in FIG. 4, is pivotally connected to one extremity of arm 114. The other extremity of arm 114 is firmly mounted by appropriate means upon shaft 72 for rotation therewith.

Figure 6:
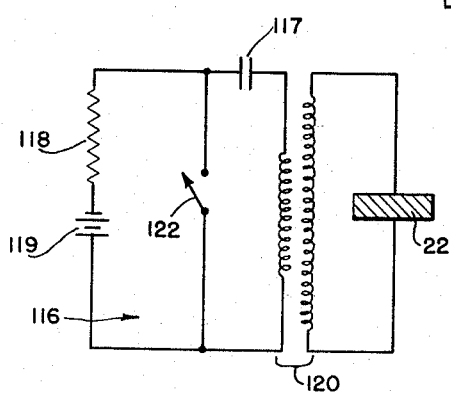
FIG. 6 is a schematic circuit diagram of an alternative embodiment to the means shown in FIG. 5.

An alternative form of means for changing the battery D.C. to a time variable voltage is provided by the battery condenser system 116 illustrated in FIG. 6. System 116 comprises an electrically capacitive means such as condenser 117, a resistor 118 coupled in series with both the condenser and battery 119 for charging the condenser, and means such as transformer 120 for inductively coupling the transformer to plate 22. Such a B-C system also includes switch means 122 coupled in parallel with the condenser and transformer primary in order to complete a firing circuit whereby the condenser is discharged through the primary upon switch closure. Because the time interval of energization of plate 22 following switch closure is a function only of the circuit constants because discharge then decays, no timing device such as switch 100 is necessary with this alternative embodiment.

Figure 2:
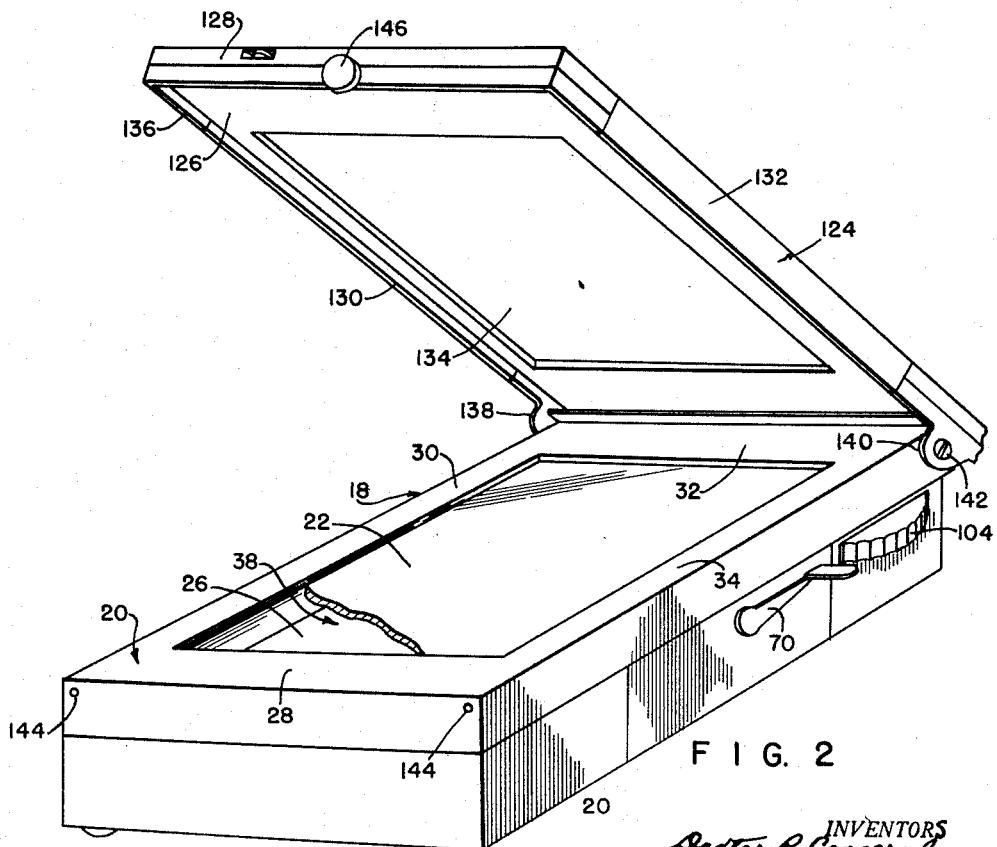
FIG. 2 is a partially cut away, partially fragmentary perspective view of the apparatus of FIG. 1.

Copier apparatus 18 also includes means, such as element 124, for releasably retaining a photosensitive sheet in a predetermined relation to the luminescent plate. The view of FIG. 2 illustrates the front side of element 124, i.e., the side which is adapted for positioning to face light emanating from the electroluminescent plate. Element 124 includes a front plate 126 and a rear plate 128 held together by suitable fastening means such as edge members or clips 130 and 132 which extend along two, opposite, common edges of the front and rear plates. Front plate 126 includes a cut-out area 134 formed centrally therein and which is employed for positioning and framing a photosensitive sheet element during its exposure. Plate 126 is also provided about at least three sides thereof with a peripheral wall or bead 136 which extends substantially perpendicularly from the front side of element 124 thereby forming a shallow protective lip. Bead 136 is shaped at two portions thereof, located upon opposite edges of front plate 126, with upstanding portions 138 and 140 to provide brackets upon which element 124 may be mounted relative to bed 20. Bed 20 includes means, such as studs 142 (only one shown) positioned at opposite edges of the bed adjacent one end thereof for mounting element 124. Portions 138 and 140 are provided with appropriate apertures through which corresponding studs 142 may respectively extend and about which element 124 is therefore rotatable. The latter is so positioned that its rotation about the studs is to and from a position wherein front plate 126 is substantially parallel with the bed, and area 134 is closely adjacent to, substantially coextensive with and directed toward plate 22. At least the portion of element 124 which includes area 134 is also rectangular in form and is preferably so dimensioned that when it is rotated into substantial parallelism with bed 20, lead 136 extends about the three sides of the juncture of element 124 and bed 20 closely enough to substantially function as a means for excluding light from the juncture.

Detent means, such as protuberant portions or bosses 144, are provided at the other end of bed 20 from the location of studs 142. Bosses 144 project outwardly from the bed sufficiently to releasably engage and frictionally retain corresponding portions of bead 136 when element 124 is rotated into its position adjacent the bed. A manually engageable knob 146 is mounted at the unpivoted end of element 124 for convenience in rotating the latter to engage and disengage bead 136 from bosses 144.

Front plate 126 and rear plate 128 are so constructed that the marginal areas of plate 126 which overlie portions of plate 128 are spaced from one another in order to provide, between the two plates, a chamber having an entrance port or elongated slot 148 located between the plates and into which a photosensitive element is to be inserted for positioning and exposure when in area 134.

A preferred embodiment of a photosensitive element constitutes a portion of a composite, sheet-like assembly such as the structure shown in FIGS. 9 and 10 at 150 and comprising a plurality of sheet-like and other elements in generally superposed relation. The outermost of these elements is an enclosing envelope 152 formed, for example, of an opaque paper stock which is folded or sealed against the entrance of actinic light along three of its edges. The fourth edge 154 of the envelope is unsealed to permit withdrawal or reinsertion of the components which it contains, as will be described hereinafter.

Inside envelope 152, is sheet 156 which includes an image-receiving layer as described heretofore with respect to the photographic transfer process. Sheet 156 is so dimensioned as to be slidably removable from the envelope, the rearward edge of the sheet being indicated by the broken line 156a. A masking sheet 158 having a cut-out central portion 159 is releasably bonded onto the image-receiving surface of sheet 156 to define the area of the latter which will ultimately bear the completed positive image or picture. Sheet 158 is mounted on an interior wall of the envelope over a small area 160 as by an adhesive substance. Sheet 158 is provided adjacent area 160 with linear perforations 162 which allow the ready separation of sheet 158 from the envelope by tearing along the line of the perforations and thus the removal of sheet 156 from the envelope at the discretion of the operator of the invention.

Located immediately adjacent masking sheet 158 within the envelope is sheet 164 bearing a photosensitive emulsion. Photosensitive sheet 164 is also dimensioned to be slightly less in width than the envelope to permit its relative slidable movement within the latter, the rear edge of sheet 164 is indicated by the broken line 164a. An elongated, liquid-carrying container 166, enclosing a supply of processing composition as hereinbefore mentioned, is mounted on the emulsion side of sheet 164 as by suitable adhesive means. The container is so positioned on sheet 164 that a pair of the container's superposed marginal areas 168, which are releasably bonded together so as to separate when subjected to a given mechanical stress, are located adjacent an interior edge of the cut-out portion of masking sheet 158, and accordingly, adjacent image areas of the photosensitive and image-receiving sheets. A multipurpose clip 170, preferably formed of a material such as steel or a plastic, is permanently fastened to the edge of photosensitive sheet 164 which is adjacent unsealed edge 154 of the envelope. Clip 170 is mounted to press together the open sides of edge 154 and provide a closure which prevents unwanted entrance of actinic light through edge 154 to the photosensitive sheet contained within the envelope.

Copier apparatus 18 also comprises means for effectuating diffusion-transfer reversal processing of assembly 150. Such a means is shown in FIGS. 11 and 12 and includes a pair of pressure-applying members such as elongated pressure rollers 172 and 174 mounted upon holder element 124 adjacent slot 148. These latter are preferably formed of a noncorrosive metal, such as stainless steel, and are mounted with their longitudinal axes substantially parallel with one another and with the elongated dimension of slot 148.

Roller 172 is mounted for rotation in suitable bearing means located adjacent respective first ends of a pair of carriers such as arms 176 and 178. The latter are in turn pivotally fastened at their respective other ends to opposite edges of rear plate 128 by appropriate fastening means or screws 180 (only one being shown), thus allowing roller 172 to be moved transversely of its longitudinal axis toward and away from roller 174. Roller 174 is in turn mounted for rotation in appropriate bearing means provided at each end of recess 182 which is formed as a transversely extending, semi-enclosed depression in plate 128. Roller 172 is biased toward roller 174 by arcuate spring 184, an intermediate portion of which bears against the under side of recess 182 of rear plate 128. Spring 184 bridges an elongated element such as rod 186, the ends of the spring bearing respectively against the extremities of the rod, this arrangement of spring 184 and rod 186 being most clearly shown in FIG. 12. Separating means described hereinafter are also included for moving roller 172 away from roller 174 and for then holding the rollers in spaced relation to one another, thus permitting insertion of the composite sheet-like assembly between them and into slot 148.

Light-shielding means, for preventing entrance of unwanted actinic light to a photosensitive surface identified with one of the sheet-like components, is preferably located adjacent the "bite" of the pressure rollers. A suitable light-sealing device comprises a soft rubber roller 188 having its axle 190 mounted for both rotation and movement transversely of its longitudinal axis and in slots 192 and 194 formed respectively in pivotal arms 176 and 178. Light-shielding roller 188 is biased at its extremities toward plate 128 by wire springs 196 (only one shown). When the composite assembly has been loaded between the rollers, a protective light-shielding housing or cover 198, pivotally attached to plate 128 by bearing means 180, serves as a removable enclosure for all of the rollers. Cover 198 is shown in FIG. 11 at an open or uncovering position which permits direct access to the rollers. Cover 198 is so formed that when it is in closed position, as shown in FIG. 12, a portion thereof is displaced a predetermined distance from plate 128 thereby forming a slot 199 into which the composite assembly may be inserted to commence loading. A slidable latch 200 actuated by manipulation of knob 202 attached thereto is provided for releasably retaining cover 198 in its closed position.

For a more thorough description of the constructional details of a composite sheet-like assembly of the type mentioned herein, reference is made to the copending application, U.S. Serial No. 596,923, filed July 10, 1956, by Albert J. Bachelder et al. Descriptions of other examples of means for effecting diffusion-transfer reversal processing generally may be found in U.S. Patents Nos. 2,435,717, 2,435,718, 2,576,022, 2,653,527, 2,671,389, 2,671,393 and 2,706,937 all issued to Edwin H. Land, U.S. Patents Nos. 2,543,160 and 2,681,602, issued to Murry N. Fairbank, and in U.S. Patent No. 2,554,890, issued to Otto E. Wolff et al. For more particular constructional details of means for applying compressional force to effect diffusion-transfer reversal processing of a composite assembly as herein described, reference is made to said application of Albert J. Bachelder et al.

Before loading the composite assembly into the processing and exposing device, it is necessary to move the pressure rollers transversely of one another and hold them in spaced-apart relation, thereby permitting unobstructed insertion of the composite assembly from slot 199 through the rollers and through entrance port 148 to the semi-enclosed chamber between front plate 126 and rear plate 128. This is effected by the mechanism shown in FIG. 12 wherein the extremities of rod 186 are respectively mounted in slots 204 and 206 respectively provided in appropriate portions of arms 176 and 178. A bracketing element such as yoke 208 is firmly mounted on rear plate 128 and extends outwardly on opposite sides of rod 186. Lever 210 is mounted for rotation at one end thereof upon interior bearing surfaces of yoke 208, the other end of lever 210 having a manually operable handle 212 formed as an integral part thereof. A roller type bearing 214 is adjacent the pivoted end of mounted lever 210 approximately parallel with and therefore disposed eccentrically with respect to the pivotal axis of shaft 210. Whenever the lever mechanism is actuated by rotation of shaft 210, bearing 214 moves with a component force directed transversely of the longitudinal axis of rod 186. As the bearing is in engagement with rod 186, the rotation of shaft 210 forces the rod to move either against or with the bias of spring 184. Because of the mounting of the rod upon pivotal arms 176 and 178, it will be seen that roller 172 is therefore correspondingly movable with rod 186. Shaft 210 is rotatable such that rod 186, being driven against the bias of spring 184, moves roller 172 to a predetermined distance transversely spaced from roller 174, the rod being releasably locked in this position when shaft 210 has reached the limit of its travel.

To operate copier 18, the material in sheet form sought to be copied is placed atop plate 22, the material being limited to substantially sheet-like elements, such as photographic prints which are translucent or transparent, capable of modulating light during passage of the latter from plate 22 to the photosensitive element. Element 124 is then rotated about studs 142 to its position in which area 134 is substantially parallel and adjacent with bed 20, thereby sandwiching the sheet-like material between plate 22 and element 124. Element 124, in this position is closed completely upon bed 20 with bosses 144 in engagement with bead 136 to releasably retain element 124 in its fully closed position. Element 124 may be loaded either when in its open position or when in this closed position.

To load element 124, composite assembly 150 is inserted through slot 199, forcing spring-biased roller 188 to one side, assembly 150 then being advanced through the space provided by the displaced pressure rollers and into the chamber between the plates. The advancement of assembly 150 continues until the juncture of the plates opposite slot 148 presents a limit stop which prevents further movement of the composite assembly. During the loading operation, the composite assembly, including clip 170, is permitted to slide easily past spring-loaded detent vanes 216 and 218 and detent blade 220, all of which are mounted in element 124. The detent blade engages a portion of clip 170 so that, when envelope 152 is withdrawn through slot 199 a predetermined distance, photosensitive sheet 164 is retained uncovered in a position within area 134 for exposure. Envelope 152 is provided with raised portions such as platforms 222 and 224 which are suitably disposed thereon adjacent edge 154 so that, when the envelope is withdrawn through slot 199, platforms 222 and 224 are engageable with detent vanes 216 and 218 respectively to provide a limit stop for the withdrawal of the envelope and to prevent the complete withdrawal of the latter unless the withdrawal force exceeds a predetermined magnitude.

In order to effect exposure of the uncovered photosensitive sheet 164, shaft 72 is rotated by manipulation of handle portion 70, the shaft being rotated as far as possible in one direction. This rotation forces bearing 68 against rod 54, overcoming bias of spring 64 and moving plate 22 away from floor 26. This motion of the plate continues with the rotation of shaft 72 until the plate is arrested in a position wherein the sheet-like material sought to be copied is firmly retained in engagement with the plate on one side thereof and the uncovered photosensitive sheet upon the opposite side thereof.

At a point near the end of the rotation of shaft 72, preferably after the motion of plate 22 has been arrested, blade 97 of switch 98 engages jack 99, thereby closing the circuit between battery 80 and transistors 84 and 86 to produce a voltage across plate 22 and exciting the latter into luminescence. It should be noted that the luminous intensity of the plate may appear very low, being almost unobservable to the unaided eye under normal room lighting. However, because of the mounting of the plate with respect to the photosensitive sheet, and because of the excellent high speed photographic emulsions available, this low luminous intensity proves surprisingly adequate to thoroughly expose photosensitive sheet 164 if maintained for a sufficient period of time.

In this respect, the closure of switch 94 is accompanied by the commencement of the operation of timing switch 100. The rotation of shaft 72 is transmitted through the linkage of arm 114 and link 113 to lever 112, moving the latter to its displaced position and starting the operation of the clockwork mechanism. In order to determine the exposure period, the operator, prior to rotating shaft 72, turns wheel 104 from its rest position to a predetermined angularly displaced position noted by the correspondence of appropriate indicia on the wheel with a fiducial mark on bed 20. This turning of the wheel winds the clockwork mechanism and also rotates pinion gear 105 in one direction, the angular displacement of the pinion being proportional to the angular displacement of the wheel. The rotation of the pinion moves rack 106 from its open circuit or limit stop position wherein lead 108 and whisker 107 are not in contact with one another to a displaced or contact position in which the lead and whisker are engaged with one another. The distance that the rack moves from its open circuit position is therefore also proportional to the angular displacement of the wheel. The release of the clockwork mechanism by the movement of lever 112 to its second position causes the clockwork mechanism to rotate pinion 105 at a substantially constant speed in an opposite direction, thus moving rack 106 at a predetermined speed back toward its open circuit position. During this retrograde movement of the rack, whisker 107 remains in sliding engagement with contact 110 until the motion of the rack carries the whisker past an extremity of and out of engagement with the contact, thereby opening the circuit to plate 22 and extinguishing its excitation field. The rack has then arrived back at the open-circuit position. For the circuit values of the oscillator as hereinbefore disclosed, a range of time intervals from 0 to 10 seconds for the operation of switch 100 has been found to be adequate, depending upon a photographic emulsion of reasonably fast speed being employed as photosensitive sheet 164.

After the completion of the photographic exposure, envelope 152 is returned to the limit of its motion inwardly of the semi-enclosed chamber, thereby enclosing the exposed photosensitive sheet. Composite assembly 150 is now ready for the processing operation.

When lever 210 is rotated in a clockwise direction, as viewed in FIG. 12, it moves bearing 214 away from spring 184. This allows rod 186 to move under the bias of spring 184, the spring also moving pressure roller 172 toward pressure roller 174 until the pressure rollers are caused to engage upon opposite sides of assembly 150 adjacent container 166. The clockwise rotation of lever 210 also actuates linkage means connected with detent vanes 216 and 218 and with detent blade 220 for moving the detent elements from the positions, previously described, in which they are respectively in contact with platforms 222 and 224 and clip 170 of assembly 150. The linkage means comprises a plurality of elements which are engageable with one another and shown generally at 226. For a more detailed description of one form of such a linkage means, reference is made to the aforesaid U.S. application, Serial No. 596,923 of Albert J. Bachelder et al.

To process the components of composite assembly 150, a portion of envelope 152 which extends through slot 199 is grasped and the entire assembly is then drawn, preferably at an even rate of speed, between the pressure rollers which are actively biased toward one another. With the construction shown, the withdrawal of the composite assembly will be arrested when clip 130 engages the pressure rollers. At this point, roller 172 is moved away from roller 174 by rotation of lever 210 as far as it will go in a counterclockwise direction, reversing the sequence of operations hereinbefore described with respect to the pressure rollers. The assembly may now be withdrawn completely from element 124, the passage of clip 170 no longer being obstructed by the rollers. As assembly 150 was drawn through the pressure rollers, container 166, enclosing the fluid processing composition, was subjected to compressional forces by the rollers and ruptured along marginal areas 168 to release the fluid processing composition. The continuing movement of assembly 150 then caused the fluid processing composition to be spread by the compressional forces of the pressure rollers in a layer of predetermined thickness between the contiguous facing areas of photosensitive sheet 164 and the image-receiving layer of sheet 156.

Following the withdrawal of the composite assembly from element 124, the assembly is preferably allowed to remain in an unaltered, assembled state for a predetermined period to complete the processing operation. At the end of the period, by grasping clip 170, the developed photosensitive sheet 164, sheet 156 which now carries a print, and masking sheet 158 attached to the latter, are all withdrawn from the envelope as a unit. Sheet 156 is now stripped from the sandwich formed by the three sheets and the processing composition, leaving the masking and photosensitive sheets. Sheet 156 is now a substantially dry print which is a copy of the sheet-like material which had been inserted into copier 18, having been produced in a very short time.

The form of copier apparatus heretofore described is useful primarily for direct "print-through" type of contact printing, characterized in that the copy material is sandwiched between the electroluminescent plate and the photosensitive sheet. It is apparent that copier 18 may be constructed in an alternative form in which "reflex" type of contact printing can be performed. This may be accomplished simply by re-locating the electroluminescent plate to the inside of holder element 124 so that composite assembly 150 can be inserted adjacent and substantially parallel with the plate. The provision of a movable reflecting plate within well 38 in place of the electroluminescent plate provides a backing or support upon which the material to be copied is placed. The rotation of element 124 into its closed position, and the elevation of the support then sandwiches the photosensitive sheet of the composite assembly between the material to be copied and the electroluminescent plate. Of course, for use with such an apparatus, photosensitive sheet 164 necessarily is formed as a light-transmitting sheet so that radiation from the electroluminescent plate may pass therethrough and be reflected back in various degrees from the surface of the copy material.

Figure 13:
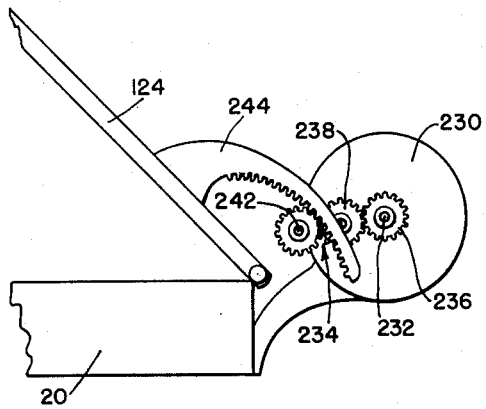
FIG. 13 is a side elevation, schematic view of an alternative embodiment of electrical energization means constituting a portion of an apparatus embodying the invention.
Figure 14:
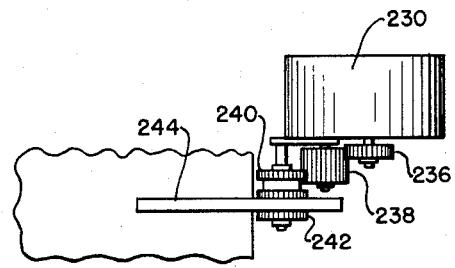
FIG. 14 is a top plan view of the embodiment of FIG. 13.
Figure 15:
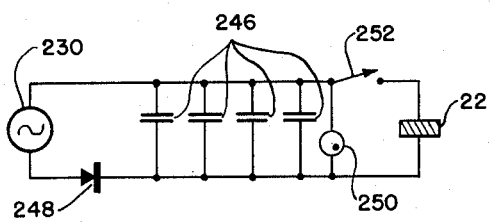
FIG. 15 is one form of a schematic circuit diagram of the embodiment of FIG. 13 showing its connection with an electroluminescent element.

Another alternative form of means for providing the excitation field to be applied to plate 22 is shown in FIGS. 13 through 15, and includes magneto 230 mounted adjacent the pivoted end of bed 20, the latter being shown in fragment only. The rotor of the magneto is provided connected to its pivotal axis or axle 232 with a gear train 234 comprising a driving pinion 236 mounted on axle 232, an idler gear 238 in meshing engagement with pinion 236, and a driven pinion gear 240 in meshing engagement with idler gear 238. Pinion gear 240 is mounted concentrically with a similar gear 242 by one-way clutch means so that rotation of axle 232 occurs only when pinion gear 242 is rotated in one direction and not when the latter is rotated in the opposite direction. Mounted upon element 124 and movable therewith is an arcuate, toothed element or rack 244 which is in engagement with other gear 242 throughout the arc of movement of element 124 about its pivotal axis. When element 124 is rotated from its open position toward the closed position wherein area 134 is adjacent and parallel with plate 22, rack 244 rotates gear 242 in the appropriate direction, the rotation of element 124 being transferred through the gear train to the magneto for generating a pulse of electrical power. The gear ratios are preferably adjusted to turn axle 232 at a very high rate of speed while element 124 is being rotated comparatively slowly.

As will be seen in the circuit in FIG. 15, the magneto is indicated schematically at 230 and is in parallel with a bank of condensers 246. In the event that no one-way clutch means is provided between pinion gear 240 and gear 242 (magneto 230 then being rotatable both clockwise and counterclockwise with the rotation of element 124) the circuit includes rectifying means 248 to insure the passage of electrical current from the magneto to the condensers in only one direction regardless of the rotation of the magneto. In the preferred embodiment the rotation of element 124 and the corresponding high speed rotation of the magneto provides an E.M.F. which is capable of charging the condensers to an overload with respect to the voltage requirements of plate 22. The circuit includes, in parallel with condensers 246, a leakage element such as a neon tube 250. The combination of a magneto having an overload E.M.F., the neon tube, and the condensers insures that the latter are chargeable to the correct level by overloading them and leaking off the excess voltages through the neon tube. The condensers are disposed in parallel circuit relation with plate 22 and are dischargeable across the electroluminescent plate by closure of switch 252.

Figure 16:
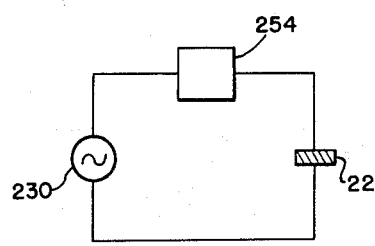
FIG. 16 is a schematic circuit diagram of another alternative form of an electrical energization means.

In yet another alternative embodiment shown in the schematic circuit of FIG. 16, magneto 230 is manually operable, having no connection with element 124 and the output of the magneto is fed through known voltage regulating or limiting means 254 directly to plate 22 without storage of any charge in capacitive elements.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An apparatus for producing photocopies of subject matter in sheet form upon photosensitive sheet material, said photosensitive sheet material being a portion of a composite assembly which includes an image-receiving sheet and container means enclosing a supply of processing composition for treating said photosensitive sheet material and said image-receiving sheet, said apparatus comprising, in combination, an electroluminescent plate, support means for releasably retaining said photosensitive sheet material in a predetermined position therein, said support means being mounted for movement toward and away from a location wherein said photosensitive sheet material is closely adjacent said electroluminescent plate, means responsive to movement of said support means for electrically exciting said plate for generating radiation, said means for electrically exciting said plate comprising an electrically capacitive element, an electrical power source including electrical energy generating means responsive to movement of said support means for charging said capacitive element, a transformer, the secondary winding of said transformer being in parallel circuit relation to said plate, and switch means for coupling said capacitive element to the primary winding of said transformer so as to discharge said capacitive element and excite said plate, means for so positioning said subject matter relative to said support means and said plate as to modulate said radiation to differentially expose said photosensitive sheet material when said support means is in said location, and processing means including a pair of pressure-applying members so mounted upon said support means that said photosensitive sheet material and the other sheets of said composite assembly are removable from said support means by advancement through said pressure-applying members whereby the latter may apply compressive force for rupturing said conatiner means to release and distribute said processing composition and process said photosensitive sheet material.

2. A photocopying apparatus as defined in claim 1 wherein said electrical power source comprises a magneto so mounted in relation to said support means and said plate as to generate electrical power when said support means and said plate are moved relative to one another.

3. In a self-contained, manually operated photocopying device for producing photocopies of subject matter in sheet form upon photosensitive sheet material, the combination of: an electrically energizable source of actinic radiation; a member movable from a first to a second position during operation of said photocopying device; a rotary member which rotates in response to movement of said movable member; electrical energy generating means responsive to rotation of said rotary member for supplying electrical energy to said source of actinic radiation; and manually operable means for moving said movable member.

4. In a self-contained, manually operated photocopying device for producing photocopies of subject matter in sheet form upon photosensitive sheet material, the combination of: an electrically energizable source of actinic radiation; a member movable from a first to a second position during operation of said photocopying device; a rotary member which rotates in response to movement of said movable member; electrical energy generating means coupled to said rotary member and actuated by rotation thereof to supply electrical energy to said source of actinic radiation; and manually operable means for moving said movable member.

5. The invention defined by claim 4 wherein said electrical energy generating means comprises a magneto generator.

References Cited in the file of this patent

UNITED STATES PATENTS

| 900,522 | Gravell | Oct. 6, 1908 |
| 2,692,540 | Bing | Oct. 26, 1954 |
| 2,809,316 | Jeges | Oct. 8, 1957 |

FOREIGN PATENTS

| 819,773 | Germany | Nov. 5, 1951 |
| 1,104,130 | France | June 8, 1955 |